United States Patent [19]

Taylor

[11] Patent Number: 5,134,764
[45] Date of Patent: Aug. 4, 1992

[54] ANTI-THEFT HAND BRAKE

[76] Inventor: Michael Taylor, 51 Godfrey House, Bath Street, London, United Kingdom, EC1V 9ES

[21] Appl. No.: 533,363

[22] Filed: Jun. 5, 1990

[30] Foreign Application Priority Data

Jun. 6, 1989 [GB] United Kingdom ............... 8912974
Mar. 8, 1990 [GB] United Kingdom ............... 9005269

[51] Int. Cl.$^5$ .............................................. G05G 5/00
[52] U.S. Cl. ........................................ 29/401.1; 70/201;
70/237; 70/360; 188/265
[58] Field of Search ............... 70/201, 360, 195, 197, 70/237; 29/401.1, 402.03, 402.08; 206/580; 188/2 D, 265

[56] References Cited

U.S. PATENT DOCUMENTS

| 962,448 | 6/1910 | Miller | 70/360 |
|---|---|---|---|
| 999,462 | 8/1911 | Miller | 70/360 |
| 1,321,012 | 11/1919 | Curran | 70/201 |
| 1,859,328 | 5/1932 | Cobb, Sr. | 70/195 X |
| 4,231,241 | 11/1980 | Lipski | 70/195 |
| 4,747,278 | 5/1988 | Roucelli et al. | 70/201 |
| 4,876,783 | 10/1989 | Campion et al. | 29/402.03 X |

FOREIGN PATENT DOCUMENTS

| 2343210 | 1/1975 | Fed. Rep. of Germany | 70/201 |
|---|---|---|---|
| 696621 | 10/1965 | Italy | 70/195 |
| 173157 | 12/1921 | United Kingdom | 70/195 |

*Primary Examiner*—Lloyd A. Gall
*Attorney, Agent, or Firm*—Clifford A. Poff

[57] ABSTRACT

In an anti-theft hand brake arrangement for a motor vehicle having a ratchet release mechanism operable by a push button, exposed at the end of a handbrake lever, the push-button incorporates a cylinder lock. In the locked condition, the push-button may still be depressed, but without acting on the ratchet release mechanism, while in the unlocked condition an abutment member at the inner end of the push-button is so positioned as to engage a release member of the ratchet release mechanism when the push-button is depressed, thereby to release the brake ratchet.

5 Claims, 2 Drawing Sheets

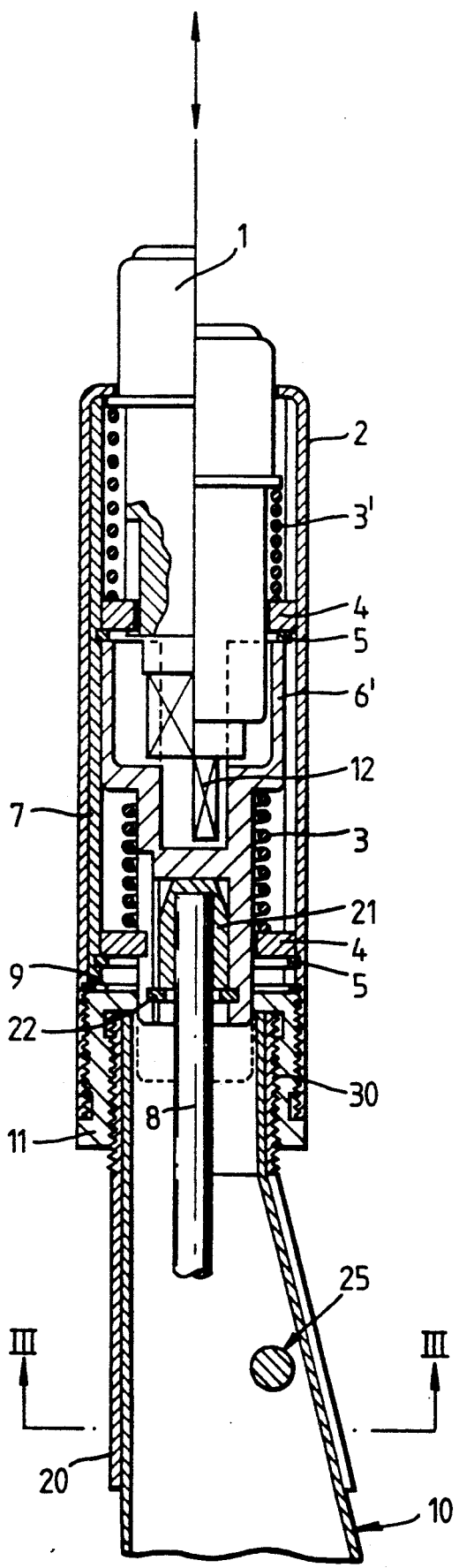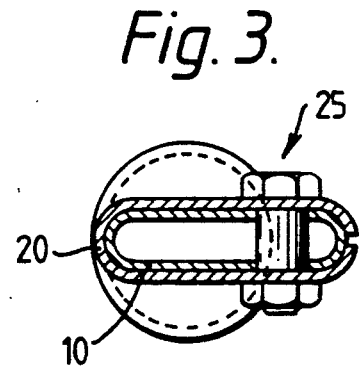

ANTI-THEFT HAND BRAKE

THIS INVENTION relates to an anti-theft mechanism operable to prevent the release of a vehicle hand brake to immobilise the vehicle and prevent unauthorised use thereof.

BACKGROUND OF THE INVENTION

1. Field of the Invention

A motor vehicle hand-brake customarily includes a hand-brake operating lever with an associated ratchet mechanism arranged to hold the operating lever, and thus the brake, in an "applied" position once the hand brake has been operated and after manual effort has been removed from the lever, until subsequent release of the handbrake by operation of a manually operable release member, such as a push-button, serves to lift a pawl from the ratchet of the ratchet mechanism whilst the lever is returned to the "released" position. A motor vehicle having such a hand-brake is herein referred to as being "of the kind referred to".

2. DESCRIPTION OF THE PRIOR ART 2

It has been previously suggested to apply a locking mechanism to the hand-brake in a vehicle of the kind referred to such that the ratchet-release member can only be moved, to release the pawl from the ratchet, when the associated lock is released. For example, it has been proposed to replace the push-button ratchet release button on the end of the conventional hand-brake lever with a push-button having a cylinder lock incorporated therein, such that the push-button can only be depressed when the lock is unlocked. Unfortunately, locking mechanisms of the latter type have proved, in practice, to be ineffective, for the locking detent or the like employed by the lock can readily be fractured and the push-button driven inwardly to release the hand-brake by applying a sharp blow with a hammer to the end of the release button.

It is an object of the present invention to provide an improved hand-brake locking mechanism which is not susceptible to circumvention in the last-noted manner.

SUMMARY OF THE INVENTION

According to the present invention there is provided an anti-theft handbrake arrangement for a motor vehicle of the kind referred to, wherein a manually actuable ratchet release mechanism is provided which is movable in the same sense whether an associated locking mechansim is locked or unlocked but is only effective to release the handbrake ratchet when the lock is in an unlocked condition.

In a preferred embodiment of the invention, the ratchet release mechanism includes a push-button exposed at the end of a generally tubular handbrake lever within which extends a pawl release rod, and wherein the push-button incorporates a cylinder lock so arranged that, in the locked condition thereof, the push-button may be depressed without acting on the release rod, whilst in another position thereof an abutment member at the inner end of the push-button is so positioned as to engage the release rod or a member fixed thereto when the push-button is depressed, thereby to release the brake ratchet.

According to another aspect of the invention, there is provided a kit of parts whereby an existing vehicle handbrake can be converted to a handbrake arrangement embodying the invention.

Embodiments of the invention are described below by way of example with reference to the accompanying drawings, in which:-

BRIEF DESCRIPTION OF THE DRAWINGS

FIG. 2 is a view, similar to FIG. 1, of a variant, and FIG. 3 is a view in section along the line III—III of FIG. 2.

DETAILED DESCRIPTION OF THE DRAWINGS

Figure 1:
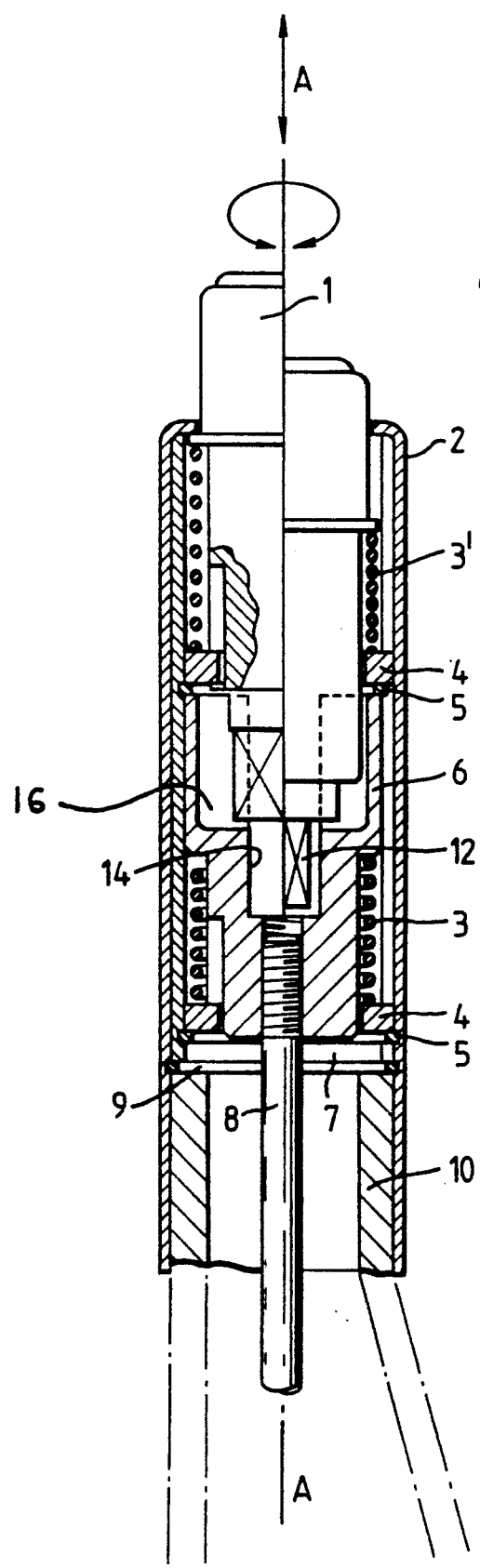
FIG. 1 is a view in axial section showing the free end of a lockable vehicle brake lever embodying the invention.

Referring to the drawing, in a vehicle of the kind referred to, a vehicle handbrake mechanism (not shown in detail) comprises, in conventional manner, a tubular hand-brake lever and a ratchet mechanism whereby the hand-brake, once applied, will not be released until a pawl of the ratchet mechanism is disengaged from the ratchet by depression of a brake release rod 8 running within the tubular hand-brake lever.

The mechanism comprises a generally cylindrical slide 6 slidable axially within the hand-brake lever and urged by a compression spring 3 into a position in which the pawl of the ratchet mechanism is engaged with the ratchet. The spring 3 is coaxial with slide 6 and with the lever and encircles the slide 6 at the lower region of the slide. The mechanism further comprises a generally cylindrical push-button 1 also slidable axially within the tubular hand lever and projecting from the free end of the latter. The push-button 1 is urged axially outwardly from the hand lever by means of a further compression spring 3' encircling an intermediate part of the push button 1.

The push-button 1 incorporates a cylinder lock connected with an abutment member 12 at the lower, inner end of the push button 1. The abutment member 12 is of non-circular cross-section, for example of oblong cross-section. In one rotational position of the abutment member 12 about the longitudinal axis of the lever, which position is adopted in the "locked" condition of the cylinder lock, the abutment member 12 is in complete register with a correspondingly shaped (for example oblong) recess 14 in an upwardly directed face 16 of the slide 6 whereby, upon axial depression of the push-button 1 in the "locked" condition, the abutment member 12 will merely move axially down into the recess 14 until the limit of axial inward movement of the push button 1 is reached, without the slide 6 being forced downward. However, in another rotational position of the abutment member 12 about the longitudinal axis of the assembly, adopted in the "unlocked" position of the cylinder lock, the abutment member 12 is out of register with the recess 14, (for example, where the member 12 and recess 14 are both oblong in cross-section, the longer sides of the oblong cross-section of the member 12 lie at right angles to the longer sides of the oblong cross-section of the recess 14). Thus, upon depression of the push-button 1, the abutment member 12 engages the upwardly presented face 16 of the slide 6 around the recess 14, whereby the slide 6 is forced axially inwardly and downwardly, thereby moving the release rod 8 correspondingly to release the pawl of the ratchet mechanism and allow the brake lever to move to the position in which the brake is released. It will be appreciated that a similar effect might be obtained by making the member 12 and recess 14 eccentric with respect to the axis of the cylinder lock. In FIG. 1, the push-button 1 is shown in the "unlocked" position to the left of the vertical line A—A and in the "locked" (and depressed position to the right of the line A—A.

It will be appreciated that forcing the push-button 1 inwardly when the cylinder lock is in the locked condition will not release the handbrake and, indeed, the push-button 1 can be moved inwardly readily in the locked state without forcing. In the "unlocked" condition, the hand-brake mechanism works in exactly the same way as a conventional mechanism.

The mechanism illustrated in FIG. 1 is intended to be applied to a conventional handbrake of an existing vehicle by a modification procedure which entails cutting the end portion from the existing tubular handbrake lever, cutting the existing brake release rod and screwthreading the end thereof and thereafter fitting the remainder of the components shown in the drawing. Alternatively, and preferably, the end of the brake release rod may be kept plain and the slide 6 may have a plain bore to receive the end of the brake release rod and the slide 6 may be bonded to the brake release rod by adhesive. In the drawing, references 10 and 8 respectively indicate the parts of the original tubular lever and push rod remaining after such a conversion procedure. As a result of the coversion procedure, the upper end of the original tubular brake lever is replaced by a tublular casing comprising a cylindrical outer sleeve 2 and a longitudinally split inner sleeve 7 which is a close fit within the outer sleeve and is held together by the latter.

The outer sleeve 2 is longer than the inner sleeve 7 and the lower end of the outer sleeve 2 fits closely over the upper end of the cut-back lever 10, whilst the lower end of the longitudinally split inner sleeve 7 abuts an internal circlip 9 within the sleeve 2 which circlip 9 engages the lower end of sleeve 7 to retain the latter.

The composite tubular casing 2, 7 encompasses the push button 1, slide 6 and springs 3 and 3', as well as location rings 4 for the springs and circlips 5 which retain the rings 4 and which circlip are engaged in circumferential grooves in the interior of the split sleeve 7.

The lower spring 3 acts between the lower ring 4 and an annular shoulder on slide 6 and upper spring 3' acts between the upper ring 4 and an annular abutment around the push-button 1.

In assembly, the remainder of the components shown are applied to the cut back lever 10 and rod 8 by fitting the lower end of a cylindrical outer sleeve 2 over the end of the cut-back lever and rotating the sleeve, and with it the components therein, to screw the slide 6 onto the threaded end of the modified rod 8 until an internal abutment in the sleeve 2, afforded by internal circlip 9, engages the end of the cut-back tubular lever 10. The sleeve 2 and the remainder of the mechanism may thereafter be conveniently held in place by an appropriate adhesive between the outer surface of the cut back tubular lever and the inner surface of the lower end of the sleeve 2, such adhesive being applied directly before fitting the casting 7, 2 to the lever 10.

The radially outer part of the push button 1, within which the barrel of the lock is rotatable by means of the appropriate key (not shown) is, of course, retained against rotation in the sleeves 2, 7 in a manner permitting longitudinal movement along the axis of the lever. This may be done, for example, by providing the upper location ring with a radially outwardly projecting lug engaging in a longitudinal groove in the interior of the sleeve 7 and further providing the upper location ring 4 with a radially inwardly projecting lug engaging in a longitudinal groove in the periphery of the push button 1. The slide 6 is preferably retained in a like manner, by the lower location ring 4, against rotation, whilst permitting longitudinal movement along the axis of the brake lever.

Referring to FIG. 2, there is illustrated a variant in which, as compared with FIG. 1, the number of components which must be specifically suited to a particular vehicle handbrake is minimised as is the work and skill necessary for fitting the mechanism to an existing vehicle handbrake. Thus, the arrangement of FIG. 2, as compared with the arrangement of FIG. 1, additionally comprises an adaptor sleeve 20 adapted to fit over the hand-brake lever of a specific model of car or other vehicle and which is provided, at its upper end, with an extenally screw threaded tubular cylindrical portion 30 of standard form and size externally and further comprises an adaptor cap 21 which is externally of a standard shape and size and has a plain cylindrical blind bore of a size to receive the brake release rod of the handbrake of a specific model of vehicle. Externally, the cap 21 is cylindrical over its length, apart from an upper portion which tapers frusto-conically upwards to provide a reduced-diameter upper end of cap 21. The end of the brake release rod which is received within the blind bore in cap 21 is plain and unthreaded, the cap 21 being secured on the brake release rod solely by adhesive. The cap 21 is received within a central blind bore extending from the lower end of a modified (as compared with FIG. 1) slide 6' and is held captive therein by a circlip 22 accommodated in a peripheral groove around said blind bore and projecting into the latter below the cap 21.

The outer sleeve, referenced 21 in FIG. 2, is internally threaded at its lower end and is screwed onto a collar 11 which in turn is internally screw threaded and is screwed onto the screw thread at the upper end of the adaptor 20. Alternatively, the lower end of sleeve 2' may simply be a push-fit over a plain smooth, peripheral surface of a variant collar 11. In either case, the sleeve 2' is secured to the collar 11 by adhesive. In installation of the assembly of FIG. 2, after cutting the brake release rod and the brake lever as before, the adaptor 20 is fitted over the remaining portion of the hand brake lever and is bonded thereto with adhesive. As illustrated in FIG. 3, a bolt or bolts 25 may be extended through the adaptor and the existing brake lever to hold the adaptor in place whilst the adhesive sets. The appropriate cap 21 is then applied to the free end of the remaining section of the brake release rod, being again bonded thereto by adhesive and the remainder of the assembly, of standardised form, is then screwed onto the adaptor 20. As the lock assembly moves downwards during screwing of the latter onto the handbrake level adaptor 20, the bore in slide 6' receives the upper end of the cap 21 and descends over the latter. Initially, the tapered upper end of the cap 21 engages in the bore in slide 6' and subsequently engages within the circlip 22 so that, as said downward movement of the lock assembly continues, the circlip 22 is expanded radially outwards, by said tapered end, into the peripheral groove which receives it, allowing the cylindrical portion of the cap 21 to pass the expanded circlip 22. When the assembly is fully in position, the lower end of the cap 21 clears the circlip 22, allowing the latter to spring radially inwards once more beneath the cap 21, thereafter holding the latter 21 captive with respect to the slide 6' and thereby retaining the brake release rod against axial movement relative to the slide 6. The sleeve 11 is adhesively bonded both to the sleeve 2' and to the adaptor 20 to prevent subsequent unauthorised removal.

It will be appreciated that, with the embodiment of FIG. 2, in particular, the only steps required, in addition to straightforward assembly, are the cutting of the existing handbrake lever at the appropriate position, (which need not be done particularly accurately since the adaptor 20, fitting the remaining part of the existing lever, itself provides the datum and attachment for the remainder of the assembly), and the cutting of the existing brake release rod at the desired position, (which may, for example, be done with the assistance of a simple template, temporarily mounted on the adaptor 20 after fitting of the latter).

It will be appreciated that, in the embodiments described with reference to the drawings, the invention provides a simple and convenient means of immobilising a vehicle, which is nevertheless neat and unobtrusive in appearance. Furthermore, as noted above, the structure of the preferred embodiments is such that it can readily be fitted to an existing handbrake level. Indeed, as will be recognised by those skilled in the art, some of the components encompassed by the sleeve 2, 7, may simply be components extracted from the standard hand-brake lever during the modification described.

It is contemplated that anti-theft arrangements such as described with reference to FIGS. 1 and 2, may be incorporated in existing vehicles by a professional conversion service, for example on a "while-you-wait" basis.

Thus, (assuming the preferred arrangement of FIG. 2 to be adopted) an engineering company providing such a service may maintain a stock of adaptors 20 and caps 21 for various vehicles and a supply of the standardised assemblies forming the remainder of the parts to be fitted and may thus fit such an anti-theft arrangement quickly and economically to any of a wide range of vehicles.

It is also contemplated that anti-theft arrangements incorporating the invention may be fitted to vehicles ab initio, by vehicle manufacturers.

The components necessary for such a conversion may also be sold as a kit of parts, for fitting by vehicle owners, with instructions as to the manner in which an existing handbrake may be modified using the kit, to incorporate the anti-locking mechanism.

I claim:

1. A method of adapting an existing vehicle handbrake lever, to incorporate an anti-theft arrangement, the existing vehicle handbrake lever being of the kind including a ratchet release mechanism including a push-button exposed at the end of a generally tubular handbrake lever within which extends a brake release rod connected with said push-button, the method comprising cutting an end part from said tubular handbrake lever, cutting an end part carrying the original push-button from said brake release rod, fixing a body part to the stub of the existing tubular handbrake lever, connecting a slidable member with the free end of the brake release rod, arranging a push-button with a cylinder lock for support by said body part, and providing said push-button and said slidable member with cooperating abutment means which, in an unlocked condition of the cylinder lock, are capable of interengaging to ensure that when the push-button is depressed said slidable member will follow movement of the push-button and which, in a locked condition of the cylinder lock, said abutment means will remain out of engagement to allow the push-button to be depressed without corresponding movement of the slidable member.

2. A method according to claim 1 wherein the fixing of said body part to said stub and the connection of said slidable member with the free end of the brake release rod is effected using adhesive.

3. A kit of parts, for the adaption of an existing vehicle handbrake lever to incorporate an anti-theft arrangement, said kit comprising an assembly incorporating a push-button with a cylinder lock, said assembly including a body part adapted to fit a stub of an existig hand brake lever from which an end part has been cut off, and further comprising a slidable member slidable within said body part under the action of said push-button, said slidable member being adapted to receive an end part of a brake release rod of such existing handbrake lever, left after part of the existing brake release rod has been cut off, said push-button and said slidable member having cooperating abutment means which, in an unlocked condition of the cylinder lock, are capable of interengaging to ensure that when the push-button is depressed said slidable member will follow movement of the push-button and which, in a locked condition of the cylinder lock, said abutment means will remain out of engagement to allow the push-button to be depressed without corresponding movement of the slidable member.

4. A kit of parts according to claim 3 wherein said body part includes an adaptor sleeve adapted to fit over the stub of an existing handbrake lever and having at its upper end a screw-threaded cylindrical portion, said body part further including a complementarily screw-threaded sleeve adapted to screw onto said screw-threaded cylindrical portion of the adaptor sleeve, said kit further including an adaptor cap having a bore to receive the end of a brake release rod remaining after cutting of said end part of the brake release rod, said slidable member including a recess to receive said adaptor cap when, after said adaptor sleeve has been fixed to the stub of a brake lever, the complementarily screw-threaded sleeve is screwed onto the adaptor sleeve, said adaptor cap will enter said recess in said slidable member.

5. A kit of parts according to claim 4 wherein snap retaining means is provided for retaining said adaptor cap in said recess after it has been fully inserted therein.

* * * * *